(12) United States Patent
Toner

(10) Patent No.: US 6,808,018 B1
(45) Date of Patent: Oct. 26, 2004

(54) HEAT CIRCULATION APPARATUS

(76) Inventor: Michael Toner, 8317 Rising Sun Ave., Philadelphia, PA (US) 19111

( * ) Notice: Subject to any disclaimer, the term of this patent is extended or adjusted under 35 U.S.C. 154(b) by 63 days.

(21) Appl. No.: 10/242,856

(22) Filed: Sep. 13, 2002

(51) Int. Cl.$^7$ ............................ F24D 19/00; F24H 3/06; F24H 3/04; F28F 13/12

(52) U.S. Cl. ....................... 165/299; 165/121; 165/122; 165/57; 165/55; 165/53; 237/79; 126/110 B; 126/110 E; 416/223 B

(58) Field of Search ................................. 165/299, 121, 165/122, 300, 53, 55, 57; 237/79; 126/110 B, 110 E; 416/223 B

(56) References Cited

U.S. PATENT DOCUMENTS

| | | | |
|---|---|---|---|
| 1,823,579 A | * | 9/1931 | Anderson |
| 2,808,237 A | * | 10/1957 | Fosnes |
| 3,151,670 A | * | 10/1964 | Kritzer |
| 3,324,938 A | * | 6/1967 | Berkoff |
| 4,126,268 A | * | 11/1978 | Vitale |

FOREIGN PATENT DOCUMENTS

| | | | |
|---|---|---|---|
| CH | 655379 | * | 4/1982 |
| DE | 3107330 | * | 9/1982 |
| EP | 0834727 | * | 4/1998 |
| GB | 2130705 | * | 6/1984 |
| GB | 2337811 | * | 1/1999 |
| JP | 58-195724 | * | 11/1983 |
| JP | 5-223320 | * | 2/1992 |
| JP | 10-153491 | * | 6/1998 |

* cited by examiner

Primary Examiner—John K. Ford

(57) ABSTRACT

A heat circulation apparatus includes a housing that has a perimeter wall for defining an interior space. The interior space includes an intake port and an exhaust port. The housing is designed for positioning under the steam radiator. A fan member is rotatably coupled to the housing such that the fan member is positioned in the interior space of the housing. The fan member is for drawing air through the intake port into the interior space of the housing and forcing air out of the interior space of the housing through the exhaust port. The fan member is designed for drawing cooler air into the housing and forcing the air out of the housing to be warmed by the steam radiator when the fan member is rotated with respect to the housing.

7 Claims, 5 Drawing Sheets

HEAT CIRCULATION APPARATUS

BACKGROUND OF THE INVENTION

1. Field of the Invention

The present invention relates to circulating apparatuses and more particularly pertains to a new heat circulation apparatus for evenly distributing heat accumulated at the top of a cast iron radiator.

2. Description of the Prior Art

The use of circulating apparatuses is known in the prior art. U.S. Pat. No. 2,613,663 describes an improved forced air circulation device for a heating unit and more particularly to a novel door-mounted fan. Another type of circulating apparatus is U.S. Pat. No. 2,972,941 describing an air distribution system and apparatus. U.S. Pat. No. 6,003,596 describes a cover for a steam radiator and for circulating air therepast.

While these devices fulfill their respective, particular objectives and requirements, the need remains for a squirrel cage and electric fan assembly activated by a thermo switch, for attachment to a radiator as described.

SUMMARY OF THE INVENTION

The present invention meets the needs presented above by incorporating the squirrel cage and electric fan assembly into the design.

Another object of the present invention is to provide a new heat circulation apparatus that would increase the efficiency of a radiant heating device.

Still another object of the present invention is to provide a new heat circulation apparatus that would provide superior comfort over other heating methods by providing a consistent heating pattern.

To this end, the present invention generally comprises a housing that includes a perimeter wall. The perimeter wall of the housing defines an interior space. The interior space includes an intake port and an exhaust port. The intake is for permitting air to enter the interior space of the housing. The exhaust port is for permitting air to exit the interior space of the housing. The housing is designed to be positioned under the steam or hot water radiator. A fan member is rotatably coupled to the housing such that the fan member is positioned in the interior space of the housing. The fan member is for drawing air through the intake port into the interior space of the housing and forcing air out of the interior space of the housing through the exhaust port. The fan member is designed for drawing cooler air into the housing and forcing the air out of the housing to be warmed by the steam or hot water radiator when the fan member is rotated with respect to the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
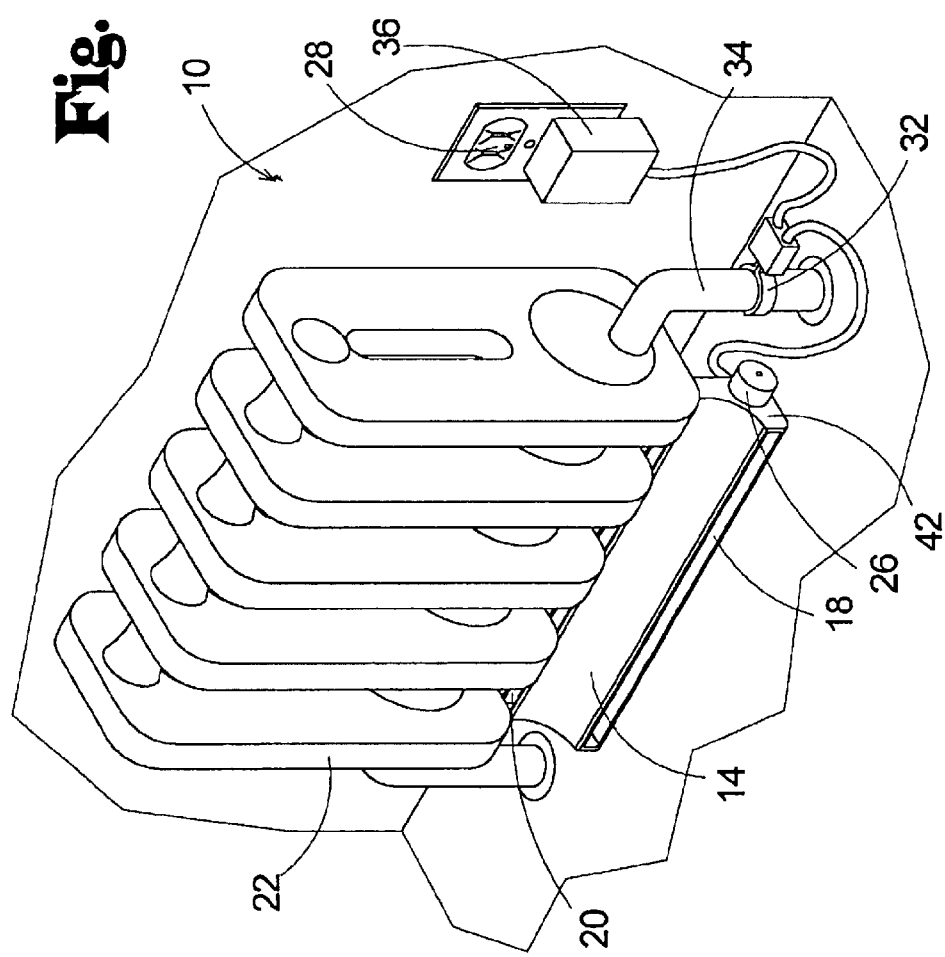
FIG. 1 is a perspective in use view of a new heat circulation apparatus according to the present invention.
Figure 2:
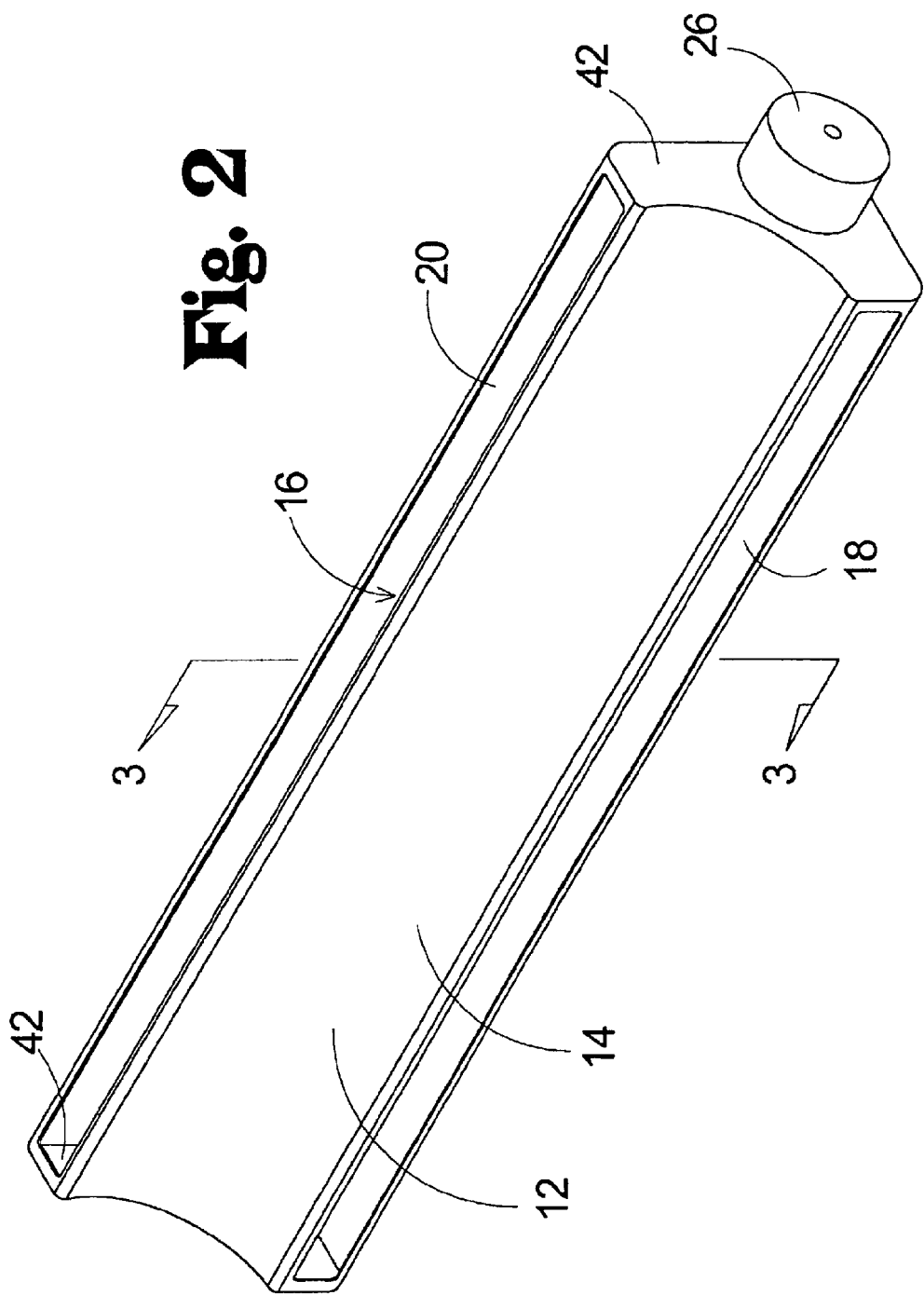
FIG. 2 is a enlarged perspective view of the housing of the present invention.
Figure 3:
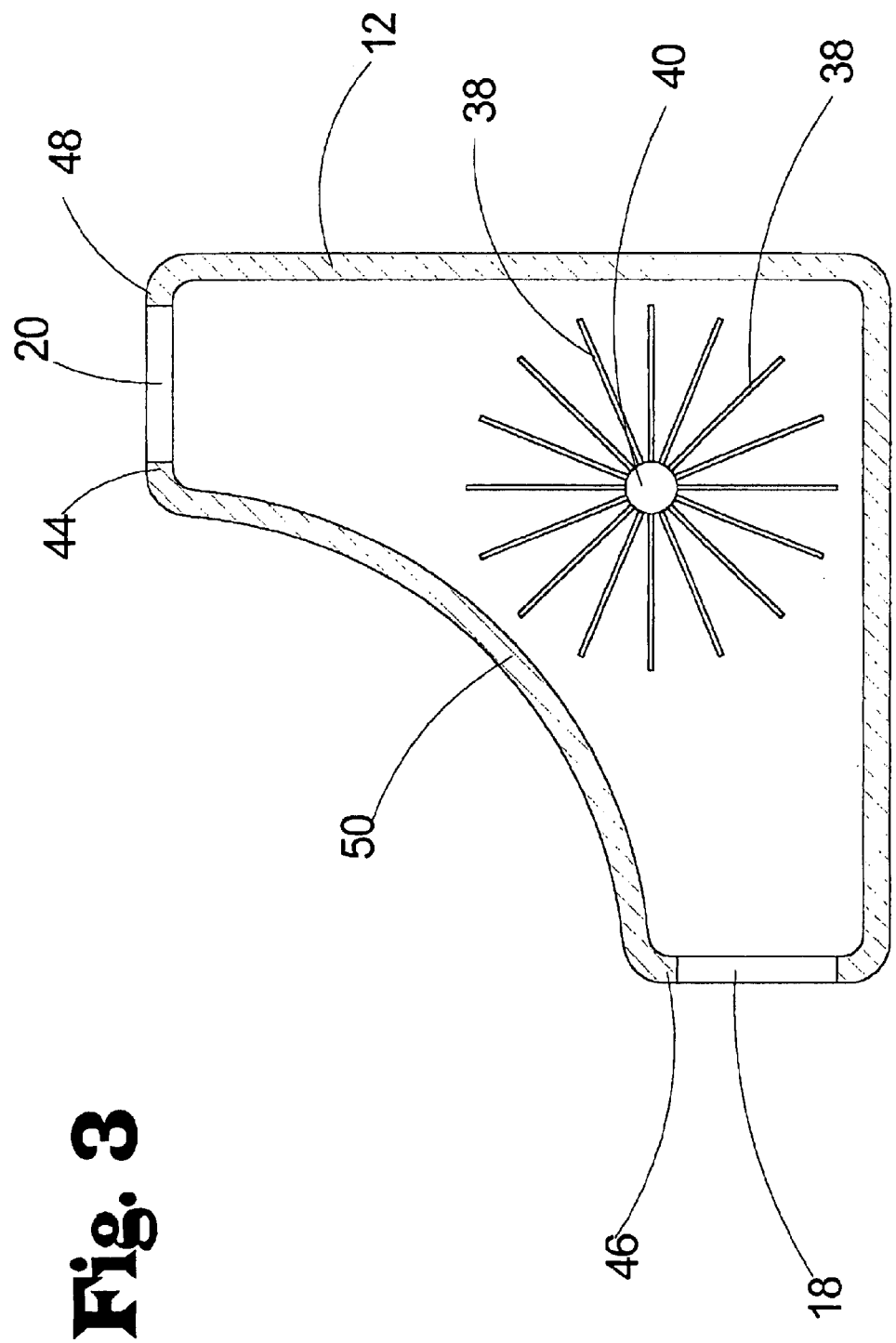
FIG. 3 is a cross-sectional view of the present invention.
Figure 4:
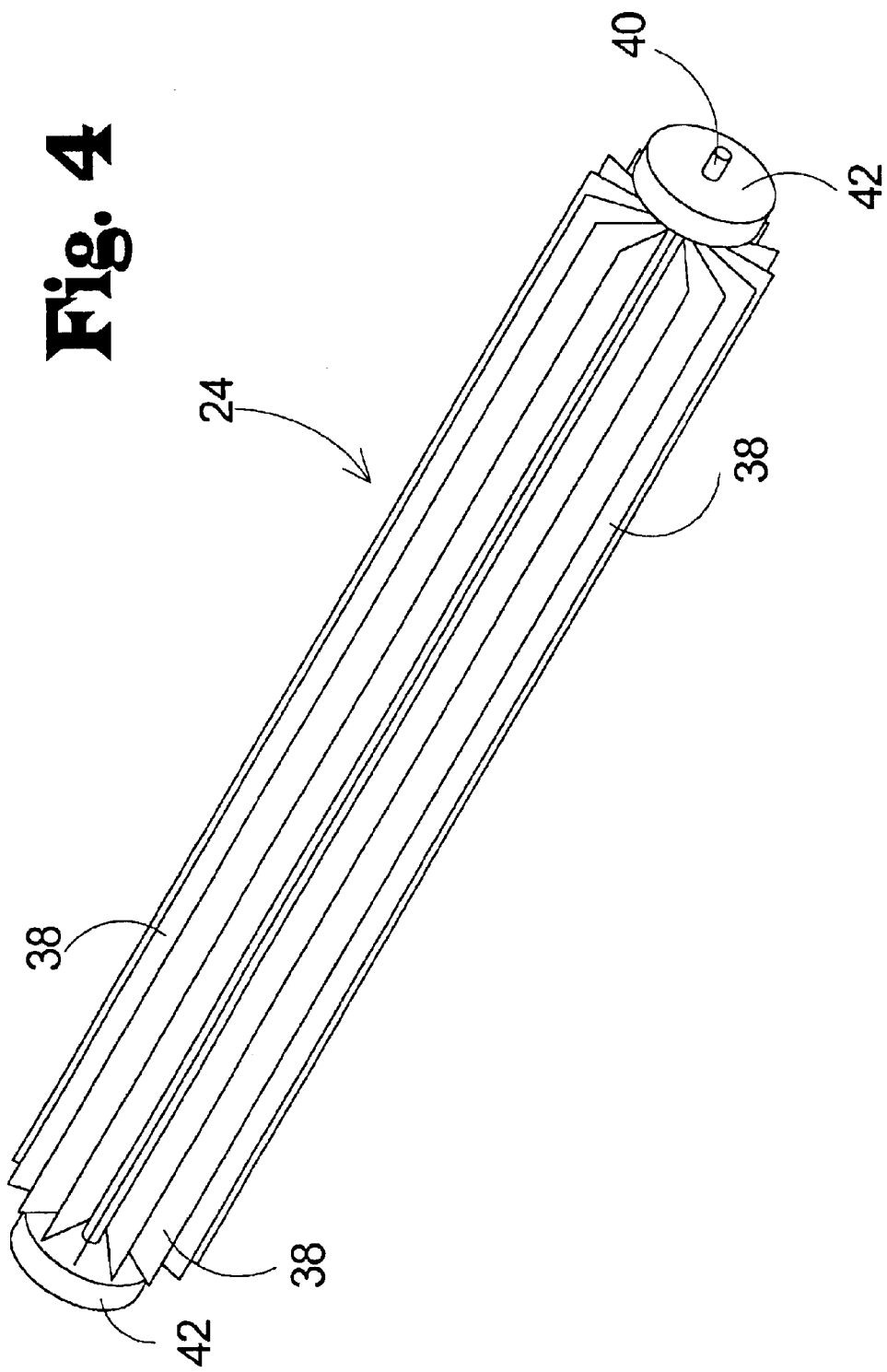
FIG. 4 is a perspective view of the present invention.
Figure 5:
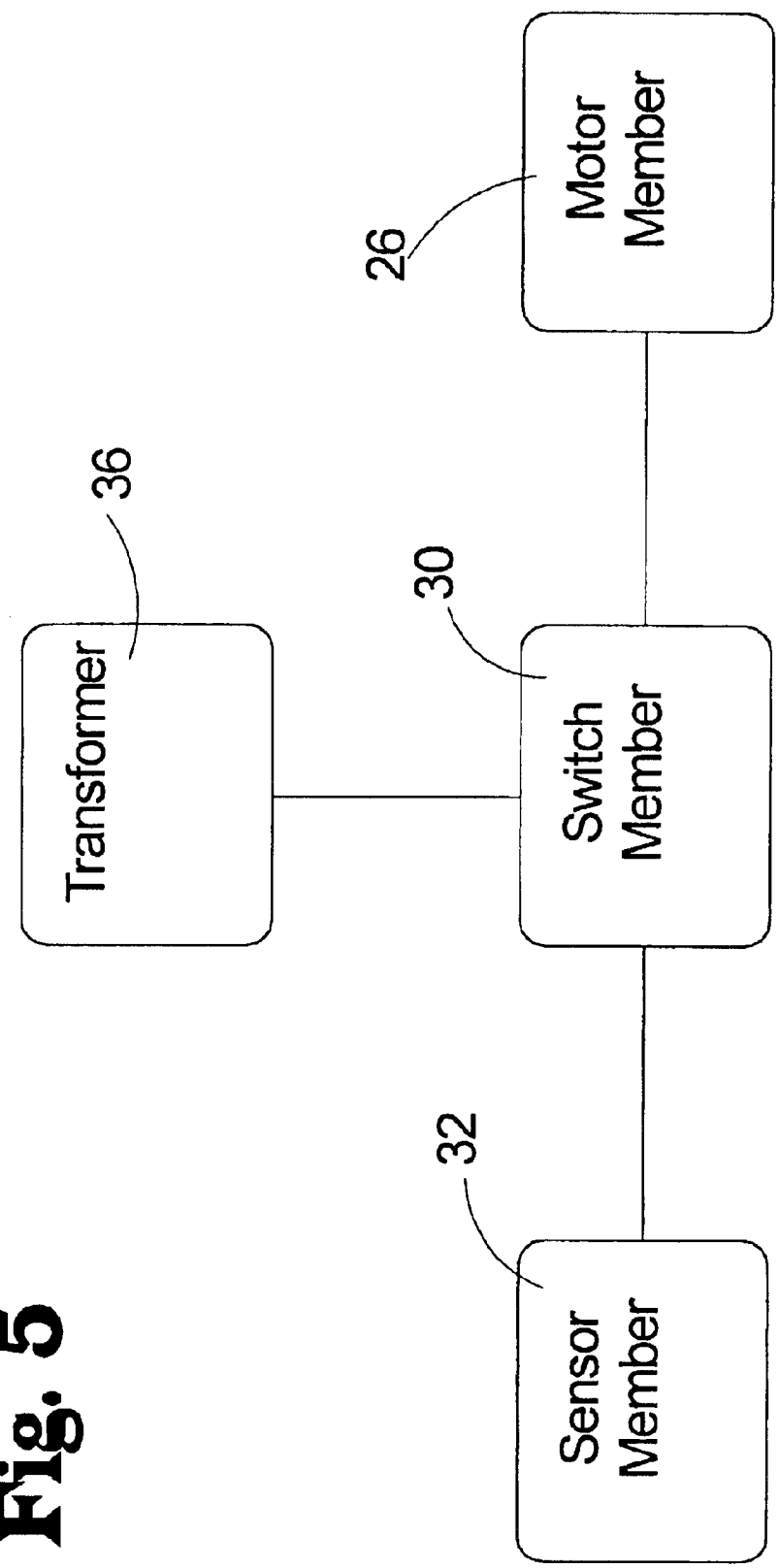
FIG. 5 is a electrical schematic view of the present invention.

With reference now to the drawings, and in particular to FIGS. 1 through 5 thereof, a new heat circulation apparatus embodying the principles and concepts of the present invention and generally designated by the reference numeral 10 will be described.

As best illustrated in FIGS. 1 through 5, the heat circulation apparatus 10 generally comprises a housing 12 that includes a perimeter wall 14. The perimeter wall 14 of the housing 12 defines an interior space 16. The interior space 16 includes an intake port 18 and an exhaust port 20. The intake 18 is for permitting air to enter the interior space 16 of the housing 12. The exhaust port 20 is for permitting air to exit the interior space 16 of the housing 12. The housing 12 is designed to be positioned under the steam or hot water radiator 22. A fan member 24 is rotatably coupled to the housing 12 such that the fan member 24 is positioned in the interior space 16 of the housing 12. The fan member 24 is for drawing air through the intake port 18 into the interior space 16 of the housing 12 and forcing air out of the interior space 16 of the housing 12 through the exhaust port 20. The fan member 24 is designed for drawing cooler air into the housing 12 and forcing the air out of the housing 12 to be warmed by the steam or hot water radiator 22 when the fan member 24 is rotated with respect to the housing 12.

A motor member 26 is operationally coupled to the fan member 24. The motor member 26 is designed to be operationally coupled to a power supply 28 for supplying power to the motor member 24. The motor member 24 is for rotating the fan member 24 with respect to the housing 12 when power is supplied to the motor member 26.

A switch member 30 is operationally coupled to the motor member 26. The switch member 30 is designed to be operationally coupled between the motor member 26 and the power supply 28. The switch member 30 is designed for controlling flow of power from the power supply 28 to the motor member 26.

A sensor member 32 is operationally coupled to the switch member 30. The sensor member 32 is designed to be coupled to an intake pipe 34 of the steam or hot water radiator 22. The sensor member 32 is designed for detecting a raise in temperature of the intake pipe 34 when steam passes through the intake pipe 34 into the steam or hot water radiator 22 such that the sensor member actuates the switch member 30 to allow power to be provided to the motor member 26.

A transformer member 36 is operationally coupled to the motor member 26. The transformer member 36 is selectively coupled to the power supply 28 such that the transformer member 36 is designed for converting power from the power supply 28 to a usable power for the motor member 26.

The fan member 24 includes a plurality of blades 38 and an axle member 40. The axle member 40 is rotatably coupled to the housing 12. Each of the blades 38 is coupled to the axle member 40 such that each of the blades 38 radially extend from the axle member 40. Each of the blades 38 is designed for circulating air from the intake port 18 to the exhaust port 20 when the fan member 24 is rotated with respect to the housing 12. The fan member 24 includes a pair of end portions 42. Each of the end portions 42 is coupled to the blades 38 such that one of the end portions 42 is opposite the other of the end portions 42. The end portions 42 are for stabilizing the blades 38 when the fan member 24 is rotated.

The perimeter wall 14 of the housing 12 includes a top wall 44. The top wall 44 has a first end 46 positioned adjacent the intake port 18 of the housing 12. The top wall 44 has a second end 48 positioned adjacent the exhaust port 20 of the housing 12. The top wall 44 has an arcuate medial portion 50 that extends between the first end 46 and the second end 48 such that the medial portion 50 is positioned proximate to the fan member 24 for minimizing the amount of air passing around the fan member 24.

In use, the present invention would be positioned under a steam or hot water radiator. The present invention utilizes a sensor member in to sense when heat is radiated from the steam or hot water radiator. When the sensor member senses heat the switch member activates the fan which forces air through the heated steam or hot water radiator circulating heat through a room.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heat circulation apparatus for circulating air through a steam radiator, the heat circulation apparatus comprising:

a housing comprising a perimeter wall, said perimeter wall of said housing defining an interior space of said housing, said interior space comprising an intake port and an exhaust port, said intake being for permitting air to enter said interior space of said housing, said exhaust port being for permitting air to exit said interior space of said housing, said housing being adapted for being positioned under the steam radiator;

a fan member being rotatably coupled to said housing such that said fan member is positioned in said interior space of said housing, said fan member being for drawing air through said intake port into said interior space of said housing and forcing air out of said interior space of said housing through said exhaust port, said fan member being adapted for drawing cooler air into said hlousing and forcing the air out of said housing to be warmed by the steam radiator when said fan member is rotated with respect to said housing;

said fan member comprising a plurality of blades and an axle portion, said axle member being rotatably coupled to said housing, each of said blades being coupled to said axle member such that each of said blades radially extend from said axle member, each of said blades being adapted for circulating air from said intake port to said exhaust port when said fan member is rotated with respect to said housing; and said fan member comprising a pair end portions, one of said end portions being coupled to a first end of each of said blades and the other one of said and portions being coupled to a second end of each of said blades such that one of said end portions is positioned opposite the other of said end portions, said end portions being for stabilizing the blades when said fan member is being rotated.

2. The heat circulation apparatus as set forth in claim 1, further comprising:

a motor member being operationally coupled to said fan member, said motor member being adapted for being operationally coupled to a power supply for supplying power to said motor member, said motor member being for rotating said fan member with respect to said housing when power is being supplied to said motor member.

3. The heat circulation apparatus as set forth in claim 2, further comprising:

a switch member being operationally coupled to said motor member, said switch member being adapted for being operationally coupled between said motor member and the power supply, said switch member being adapted for controlling flow of power from the power supply to said motor member.

4. The heat circulation apparatus as set forth in claim 3, further comprising:

a sensor member being operationally coupled to said switch member, said sensor member being adapted for being coupled to an intake pipe of the steam radiator, said sensor member being adapted for detecting a rise in temperature of the intake pipe when steam passes through the intake pipe into the steam radiator such that said sensor member actuates said switch member to allow power to be provided to said motor member.

5. The heat circulation apparatus as set forth in claim 2, further comprising:

a transformer member being operationally coupled to said motor member, said transformer member being selectively coupled to the power supply such that said transformer member is adapted for converting power from the power supply to a usable power for said motor member.

6. The heat circulation apparatus as set forth in claim 1, further comprising:

said perimeter wall of said housing comprising a top wall, said top wall having a first end positioned adjacent said intake port of said housing, said top wall having a second end positioned adjacent said exhaust port of said housing, said top wall having an arcuate medial portion extending between said first end and said second end such that said medial portion is positioned proximate to said fan member for minimizing the amount of air passing around said fan member.

7. A heat circulation apparatus for circulating air through a steam radiator, the heat circulation apparatus comprising:

a housing comprising a perimeter wall, said perimeter wall of said housing defining an interior space of said housing, said interior space comprising an intake port and an exhaust port, said intake being for permitting air to enter said interior space of said housing, said exhaust port being for permitting air to exit said interior space of said housing, said housing being adapted for being positioned under the steam radiator;

a fan member being rotatably coupled to said housing such that said fan member is positioned in said interior space of said housing, said fan member being for drawing air through said intake port into said interior space of said housing and forcing air out of said interior space of said housing through said exhaust port, said fan member being adapted for drawing cooler air into said housing and forcing the air out of said housing to be warmed by the steam radiator when said fan member is rotated with respect to said housing;

a motor member being operationally coupled to said fan member, said motor member being adapted for being operationally coupled to a power supply for supplying power to said motor member, said motor member being for rotating said fan member with respect to said housing when power is being supplied to said motor member;

a switch member being operationally coupled to said motor member, said switch member being adapted for being operationally coupled between said motor member and the power supply, said switch member being adapted for controlling flow of power from the power supply to said motor member;

a sensor member being operationally coupled to said switch member, said sensor member being adapted for being coupled to an intake pipe of the steam radiator, said sensor member being adapted for detecting a rise in temperature of the intake pipe when steam passes through the intake pipe into the steam radiator such that said sensor member actuates said switch member to allow power to be provided to said motor member;

a transformer member being operationally coupled to said motor member, said transformer member being selectively coupled to the power supply such that said transformer member is adapted for converting power from the power supply to a usable power for said motor member;

said fan member comprising a plurality of blades and an axle portion, said axle member being rotatably coupled to said housing, each of said blades being coupled to said axle member such that each of said blades radially extend from said axle member, each of said blades being adapted for circulating air from said intake port to said exhaust port when said fan member is rotated with respect to said housing;

said fan member comprising a pair end portions, one of said end portions being coupled to a first end of each of said blades and the other of said end portions being coupled to a second end of said each of said blades such that one of said end portions is positioned opposite the other of said end portions, said end portions being for stabilizing the blades when said fan member is being rotated; and said perimeter wall of said housing comprising a top wall, said top wall having a first end positioned adjacent said intake port of said housing, said top wall having a second end positioned adjacent said exhaust port of said housing, said top wall having an arcuate medial portion extending between said first end and said second cud such that said medial portion is positioned proximate to said fan member for minimizing the amount of air passing around said fan member.

* * * * *